US011227117B2

United States Patent
Brunn et al.

(10) Patent No.: US 11,227,117 B2
(45) Date of Patent: Jan. 18, 2022

(54) CONVERSATION BOUNDARY DETERMINATION

(71) Applicant: INTERNATIONAL BUSINESS MACHINES CORPORATION, Armonk, NY (US)

(72) Inventors: Jonathan F. Brunn, Logan, UT (US); Yuan Cheng, Beijing (CN); Jonathan Dunne, Dungarvan (IE); Bo Jiang, Beijing (CN); Ming Wan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 16/054,022

(22) Filed: Aug. 3, 2018

(65) Prior Publication Data

US 2020/0042595 A1 Feb. 6, 2020

(51) Int. Cl.
*G06F 40/30* (2020.01)
*G06F 16/34* (2019.01)
*G10L 15/22* (2006.01)
*H04L 12/58* (2006.01)

(52) U.S. Cl.
CPC ............ *G06F 40/30* (2020.01); *G06F 16/345* (2019.01); *H04L 51/046* (2013.01)

(58) Field of Classification Search
CPC ....... G06F 40/30; G06F 16/345; G10L 15/265
See application file for complete search history.

(56) References Cited

U.S. PATENT DOCUMENTS

| | | | |
|---|---|---|---|
| 6,537,325 B1* | 3/2003 | Nishizawa | G06F 16/345 715/267 |
| 8,782,145 B2 | 7/2014 | Cherukuri et al. | |
| 10,235,017 B2* | 3/2019 | Sheldon | H04N 21/41407 |
| 10,854,192 B1* | 12/2020 | Maas | G10L 15/05 |
| 2007/0055695 A1* | 3/2007 | Dorai | G06F 16/7834 |
| 2007/0130257 A1 | 6/2007 | Bedi et al. | |
| 2008/0077400 A1* | 3/2008 | Yamamoto | G10L 25/87 704/211 |

(Continued)

FOREIGN PATENT DOCUMENTS

| | | |
|---|---|---|
| CN | 106407178 B | 8/2019 |
| WO | 2015061373 A1 | 4/2015 |

(Continued)

OTHER PUBLICATIONS

Zechner, Klaus. "Automatic generation of concise summaries of spoken dialogues in unrestricted domains." Proceedings of the 24th annual international ACM SIGIR conference on Research and development in information retrieval. 2001. (Year: 2001).*

Galley, Michel, et al. "Discourse segmentation of multi-party conversation." Proceedings of the 41st Annual Meeting on Association for Computational Linguistics—vol. 1. Association for Computational Linguistics, 2003. (Year: 2003).*

(Continued)

*Primary Examiner* — Paras D Shah
(74) *Attorney, Agent, or Firm* — Michael O'Keefe

(57) ABSTRACT

A method, a device and a computer program product for processing a segment are proposed. In the method, a property of at least one of a first segment and a second segment in a segment set is obtained. The segment set includes a plurality of segments belonging to at least one conversation. The second segment occurs after the first segment. A boundary feature of at least one of the first segment and the second segment is determined based on the property. The boundary feature indicates whether there is a boundary of a conversation after the first segment.

15 Claims, 3 Drawing Sheets

(56) References Cited

U.S. PATENT DOCUMENTS

| | | | |
|---|---|---|---|
| 2011/0246190 A1* | 10/2011 | Suzuki | G10L 15/22 704/226 |
| 2015/0012270 A1* | 1/2015 | Reynolds | G10L 21/0272 704/233 |
| 2015/0081818 A1 | 3/2015 | Ye | |
| 2015/0120680 A1 | 4/2015 | Alonso et al. | |
| 2016/0316059 A1* | 10/2016 | Nuta | G06Q 10/04 |
| 2017/0186425 A1* | 6/2017 | Dawes | G10L 15/222 |
| 2017/0318158 A1* | 11/2017 | Lachapelle | A61B 18/245 |
| 2019/0287520 A1* | 9/2019 | Lee | G10L 13/043 |
| 2019/0294675 A1* | 9/2019 | Sapugay | G06F 40/35 |
| 2020/0027455 A1* | 1/2020 | Sugiyama | G06F 3/16 |

FOREIGN PATENT DOCUMENTS

| | | | |
|---|---|---|---|
| WO | 2016068852 | A1 | 5/2016 |
| WO | 2018036555 | A1 | 3/2018 |

OTHER PUBLICATIONS

Kolář, Jáchym, Elizabeth Shriberg, and Yang Liu. "Using prosody for automatic sentence segmentation of multi-party meetings." International Conference on Text, Speech and Dialogue. Springer, Berlin, Heidelberg, 2006. (Year: 2006).*

Levitan, Rivka, et al. "Entrainment and turn-taking in human-human dialogue." 2015 AAAI spring symposium series. 2015. (Year: 2015).*

Repp, Stephan, and Christoph Meinel. "Segmenting of Recorded Lecture Videos—The Algorithm VoiceSeg." SIGMAP. 2006. (Year: 2006).*

Elsner et al., "Disentangling Chat," Computational Linguistics, 2010, p. 389-409,vol. 36, No. 3, Association for Computational Linguistics.

Brunn et al., "Expected Group Chat Segment Duration," Application and Drawings, Filed on Sep. 29, 2017, 45 Pages, U.S. Appl. No. 15/720,265.

* cited by examiner

CONVERSATION BOUNDARY DETERMINATION

BACKGROUND

The present invention relates to processing a conversation, and more specifically, to determining a boundary of the conversation.

Persistent chat rooms are becoming more popular as a way to communicate in real time. Persistent chat enables users to create chat rooms that persist over time, and to communicate and collaborate with other users participating in the chat rooms. The users can share ideas and information by posting messages and find ideas and information by browsing or searching the chat history. Messages are saved over time, such that any user participating in the persistent chat room is able to view all the chat history at any time. In this case, the persistent chat needs to be improved to facilitate the users in viewing the chat history.

SUMMARY

According to one embodiment of the present invention, there is provided a method of determining a boundary of a conversation. In the method, a property of at least one of a first segment and a second segment in a segment set is obtained. The segment set includes a plurality of segments belonging to at least one conversation. The second segment occurs succeeding the first segment. Then, a boundary feature of at least one of the first segment and the second segment is determined based on the property. The boundary feature indicates whether there is a boundary of a conversation after the first segment.

According to another embodiment of the present invention, there is provided a device for determining a boundary of a conversation. The device comprises a processing unit and a memory coupled to the processing unit and storing instructions thereon. The instructions, when executed by the processing unit, perform acts including: obtaining a property of at least one of a first segment and a second segment in a segment set, the segment set including a plurality of segments belonging to at least one conversation, the second segment occurring succeeding the first segment; and determining, based on the property, a boundary feature of at least one of the first segment and the second segment, the boundary feature indicating whether there is a boundary of a conversation after the first segment.

According to yet another embodiment of the present invention, there is provided a computer program product being tangibly stored on a non-transient machine-readable medium and comprising machine-executable instructions. The instructions, when executed on a device, cause the device to: obtain a property of at least one of a first segment and a second segment in a segment set, the segment set including a plurality of segments belonging to at least one conversation, the second segment occurring succeeding the first segment; and determine, based on the property, a boundary feature of at least one of the first segment and the second segment, the boundary feature indicating whether there is a boundary of a conversation after the first segment.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar element.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
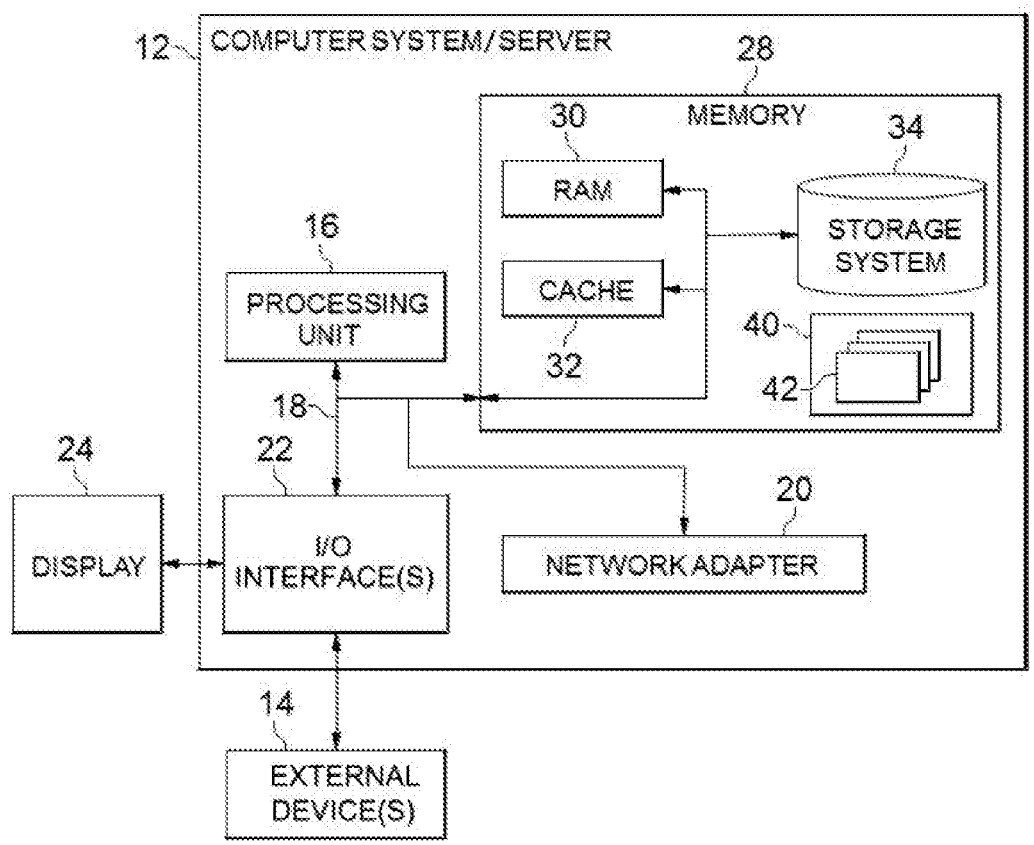
FIG. 1 depicts an exemplary computer system which is applicable to implement the embodiments of the present invention.

Referring now to FIG. 1, an exemplary computer system/server 12, which is applicable to implement the embodiments of the present invention, is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

One of the advantages of the persistent chat rooms is that a chat can persist even when a user is not actively participating in the chat. When the user returns to the persistent chat room, he/she can catch up with the chat by viewing the content that he/she has missed. However, in some cases, the user may be interested in some conversations in the chat, especially in the missed content. To facilitate the user to catch up, a summary of conversations in the content can be provided to the user. One of the problems in summarizing the conversations is that it is hard to determine the boundaries of conversations in the chat. For example, if the boundaries of the conversations cannot be determined, the start and/or the end of the conversations are unknown, resulting in inaccurate or incorrect summary of the content. As such, user experience is reduced.

In order to at least partially solve one or more of the above problems and other potential problems, example embodiments of the present disclosure propose a solution for determining the boundaries of the conversations. A property of at least one of successive segments is obtained. A boundary feature of at least one of the successive segments is determined based on the property. The boundary feature indicates whether there is a boundary of a conversation between the successive segments. As such, it can be determined whether there is a conversation boundary between the successive segments. In this way, the boundary of a conversation can be conveniently and efficiently found, and thus the conversation can be summarized in a more accurate and correct way.

As described herein, the term "conversation" refers to a set of messages in a chat around a specific topic. A chat may contain various conversations as the topic changes. A conversation has one or more boundaries, such that the conversation can be differentiated from other conversations. The boundaries may include a start boundary that separates the conversation from its prior conversation, an end boundary that separates the conversation from its subsequent conversation, and so on. The boundaries of the conversations may be determined by dividing a chat into a plurality of segments. Alternatively, the boundaries may be determined directly based on the messages in the chat. In this case, for example, a single message may be determined as a segment.

The term "segment" refers to a part of the chat. Segments may be obtained by dividing the chat in several ways, for example, according to the semantics of messages in a segment, the number of messages contained in a segment, the time of a segment, and/or the like. For example, a segment may include one or more messages occurring in a predetermined time interval. A plurality of segments may be grouped into a segment set.

The segment may be determined in a real time manner or a non-real time manner In the real time instance, new messages are added into the persistent chat over time. As a new message being added, the last segment in the chat changes over time. Instead, in the non-real time instance, the messages already in the persistent chat are divided into segments. For example, these messages or the segments may be stored in a database.

A segment has a property, which includes, but not limited to, a start time, an end time, a size, a time duration, a mandatory start, a mandatory end, a semantic start and a semantic end of the segment. The property of the segments may be determined in a variety of ways, for example, by performing semantic analysis, by applying a trained detection model, and/or by means of other suitable techniques known or to be developed in the future.

Figure 2:
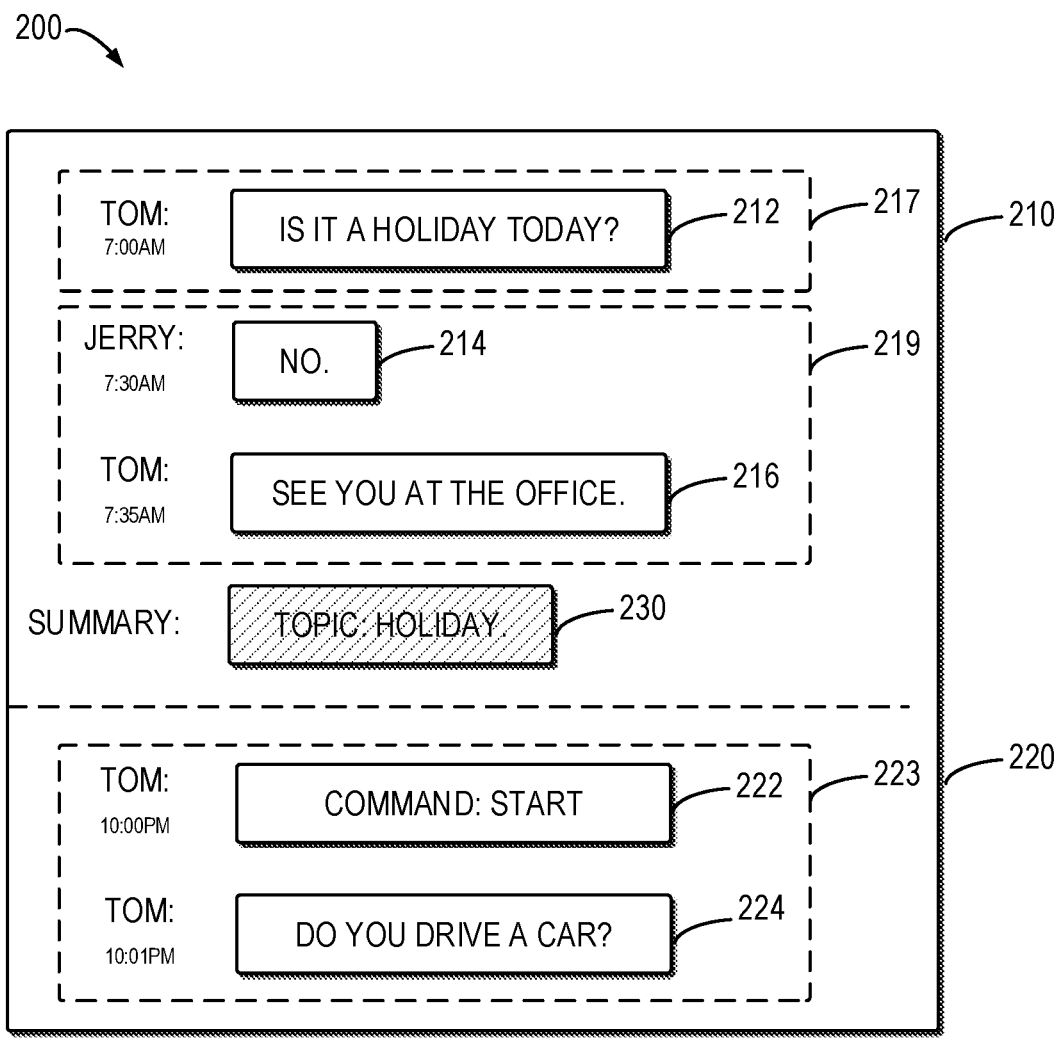
FIG. 2 depicts a schematic diagram of an example persistent chat, according to an embodiment of the present invention.

More details of embodiments for determining a boundary of a conversation in the chat will be discussed with reference to FIGS. 2-4. FIG. 2 shows a schematic diagram of an example persistent chat 200 according to an embodiment of the present invention. The persistent chat 200 is only illustrative and is not intended to suggest any limitation as to the scope of use or functionality of embodiments of the disclosure described herein.

As shown in FIG. 2, the persistent chat 200 contains five messages, the messages 212, 214, 216, 222, and 224. The message 212 contains the phrase "Is it a holiday today?" The message 214 contains the phrase "No." The message 216 contains the phrase "See you at the office." The message 222 is a mandatory start message that forces a new conversation to start. The mandatory start message may be a predetermined message specified by the system administrator. The message 224 contains the phrase "Do you drive a car?" Although FIG. 2 shows that two users participate in the persistent chat 200, a single user or multiple users can participate in the persistent chat 200.

The messages in a predetermined time interval can be grouped together to form a segment. For example, it is assumed that the predetermined time interval is 10 minutes. In addition, as shown, the time of the message 212 is 7:00 AM, the time of the message 214 is 7:30 AM, the time of the message 216 is 7:35 AM, the time of the message 222 is 10:00 PM, and the time of the message 224 is 10:01 PM. In this case, the message 212 may be grouped into a segment 217, the messages 214 and 216 may be grouped into a segment 219, and the messages 222 and 224 may be grouped into a segment 223. The three successive segments 217, 219, and 223 constitute a segment set.

Alternatively, a predetermined number of messages or messages occupied a predetermined storage space can be grouped together to form a segment. As a further alternative, a single message of the chat can be used as a segment. In this case, the segment can be obtained directly, without the need for dividing or grouping the messages.

As described above, each segment has a plurality of properties, including, but not limited to, a start time, an end time, a size, a time duration, a mandatory start, a mandatory end, a semantic start, a semantic end, and so on.

The start time indicates when a segment starts, such as the time of the first message of the segment, whereas the end time indicates when a segment ends, such as the time of the last message of the segment. For example, the start time of the segment 219 is the time of the message 214 (7:30 AM). The end time of the segment 219 is the time of the message 216 (7:35 AM). In some embodiments, the message may be an audio message in a certain time interval. In this case, the end time may be the time that the message is sent adding the time interval. For example, if the message 216 is an audio message persisting 1 minute, the end time of the segment 219 may be 7:36 AM, which is the sum of the time of sending the message 216 (7:35 AM) and the persisting time of the message (1 minute).

The size indicates the number of messages contained in the segment, the storage occupied by the segment, and the like. For example, since the segment 219 contains two messages, the size of the segment 219 is two. The time duration indicates a time length of a segment. In some embodiments, the time duration of the segment may be the difference between the start time of the first message and the end time of the last message of a same segment. For example, the time duration of the segment 219 may be 5 minutes, which is the difference between the start time of the message 214 (7:30 AM) and the end time of the message 216 (7:35 AM).

The mandatory start indicates a conversation is forced to start, whereas the mandatory end indicates a conversation is forced to end. For example, since the message 222 is a mandatory start message indicating a mandatory start, the conversation 220 is forced to start. The semantic start indicates a conversation semantically starts from the start portion of a segment. The semantic end indicates a conversation semantically ends at the end portion of a segment. For example, the segment 219, more specifically and in some embodiments, the last message 216 of segment 219, may be analyzed by a boundary analyzer being trained on phrases associated with an end of a conversation to determine the semantic end. For example, in the case that the message 216 is determined to be a semantic end, the conversation 210 ends.

The boundary analyzer may be implemented using various techniques, including natural language processing, information retrieval, knowledge representation and reasoning, machine learning, and the like. In addition, the boundary analyzer may be implemented in various forms, such as a neural network, a decision tree, or the like. In some embodiments, the boundary analyzer may be a neural network trained on phrases associated with the start and/or end of a conversation. Thus, the boundary analyzer is capable of determining whether a segment includes the start and/or end of a conversation. For example, the boundary analyzer may be trained on phrases that are continuations of a prior conversation. That is, these phrases are generally used as a reply to a prior message. For instance, these phrases may be "thanks," "this looks like a good idea," "I don't think so," "yes," "no," and the like. In this way, since the start portion (that is, the first message 214) of the segment 219 contains the phrase "no," the boundary analyzer may determine that the conversation does not semantically start from the start portion of the segment 219. Thus, it can be determined that the segment 219 does not include the start of the conversation. Similarly, it can be determined that the segment 217 does not include the end of a conversation.

It is to be understood that this is discussed for illustration, rather than limitation. Those skilled in the art would appreciate that the boundary analyzer may be implemented in other suitable forms and/or ways.

The boundary feature of any of the segments 217, 219, and 223 may be determined based on the above properties. The boundary feature indicates whether there is a boundary of a conversation between the successive segments. In some embodiments, the boundary feature may be determined based on the semantic start and end as well as the mandatory start and end of a segment. For example, in the case that the semantic end of the segment 219 indicates the conversation 210 semantically ends at the message 216, the boundary feature determined based on the semantic end indicates that there is a boundary of a conversation between the segment 219 and the segment 223. In another example, in the case that the mandatory start of the segment 219 indicates the conversation 220 is forced to start at the message 222, the boundary feature determined based on the mandatory start indicates that there is a boundary of a conversation between the segment 219 and the segment 223.

In some other embodiments, the boundary feature may be determined based on the start time, the end time, the size, the time duration and time gap of segments. For example, in the case that the size of the segment 219 exceeds a predetermined number of messages, the boundary feature determined based on the size indicates that there is a boundary of a conversation between the segment 219 and the segment 223. In addition, the total size of the successive segments can be used to determine the boundary feature. For example, in the case that the total size of the segments 219 and 223 exceeds a predetermined number of messages, the boundary feature determined based on the total size indicates that there is a boundary of a conversation between the segment 219 and the segment 223.

In another example, in the case that the time duration of the segments 219 and 223, that is the time span between the start time of the segment 219 and the end time of the segment 223, exceeds a predetermined time length, the boundary feature may be determined to indicate that there is a boundary of a conversation between the segment 219 and the segment 223. In addition, in the case that the time gap, that is the time gap between the end time of the segment 219 and the start time of the segment 223, exceeds a predetermined time length, the boundary feature may be determined to indicate that there is a boundary of a conversation between the segment 219 and the segment 223.

If the boundary feature indicates there is no boundary of a conversation between two successive segments, the computer system/server 12 merges these segments. For example, since the boundary feature of the segment 217 indicates that the segment 217 is not the end of a conversation, and the boundary feature of the segment 219 indicates that the segment 219 is not the start of a conversation, the computer system/server 12 may determine that the successive two segments 217 and 219 belong to the same conversation, and merges the segments 217 and 219.

Additionally, if the boundary feature indicates there is a boundary of a conversation between two successive segments, the computer system/server 12 generates a summary of these segments. For example, since the boundary feature of the segment 223 indicates that the segment 223 is the start of a conversation, the computer system/server 12 may determine that the segments 217 and 219 belong to the conversation 210, and the segment 223 belongs to another conversation 220. As such, the boundary of the conversation can be determined more accurately and efficiently. In this case, a summary of the conversation 210 may be made, for example, by analyzing the conversation 210 using a text analyzer. The text analyzer may be implemented using various techniques, for example, natural language processing, information retrieval, knowledge representation and reasoning, machine learning, and the like. In some embodiments, the text analyzer may be implemented as a neutral network that is trained using, for example, text tagging technique. It is to be understood that this is discussed for illustration, rather than limitation. Those skilled in the art would appreciate that the text analyzer may be implemented in other suitable forms or ways.

Still referring to the example shown with respect to FIG. 2, the summary 230 may be "topic: holiday." As a result, precision of the summary of the conversation can be improved.

As stated above, the computer system/server 12 may merge two successive segments or otherwise generate a segment summary based on the boundary feature of a single segment. Alternatively, the computer system/server 12 may merge two successive segments or otherwise generate a segment summary based on the boundary features of the two successive segments.

For example, the administrator may specify a policy that prefers to merge the segments. In this case, the computer system/server 12 may merge the two successive segments, when the boundary feature of one of the two segments indicates no boundary, regardless of the boundary feature of the other segment. For example, assume that the boundary feature of the segment 217 indicates no boundary, no matter what the boundary feature of the segment 219 is, the segments 217 and 219 may be merged.

Instead, the administrator may specify a policy that prevents the segments from being merged. In this case, the computer system/server 12 may generate a segment summary, when the boundary feature of one of the two segments indicates a boundary, regardless of the boundary feature of the other segment. For example, assume that the boundary feature of the segment 217 indicates a boundary, no matter what the boundary feature of the segment 219 is, the segments 217 and 219 will not be merged. In other words, the segments 217 and 219 may be determined to belong to different conversations. As a result, a summary of the segment 217 may be generated.

Figure 3:
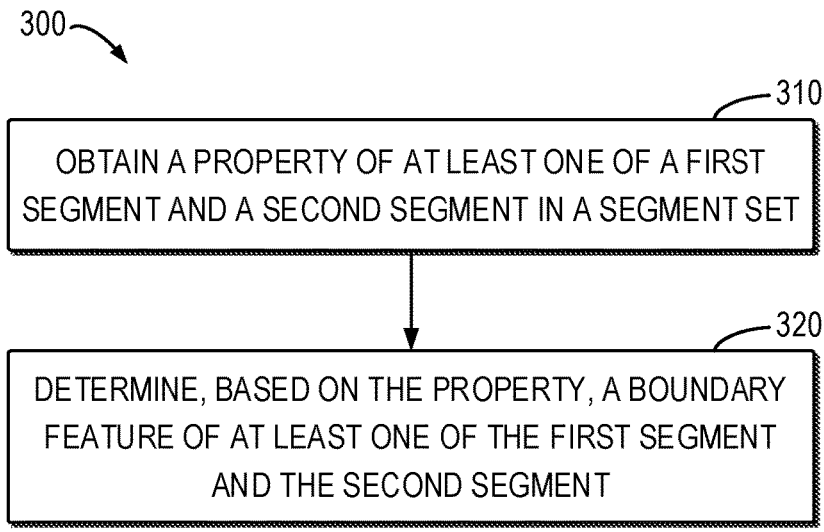
FIG. 3 depicts a flowchart of a method for determining a boundary of a conversation, according to an embodiment of the present invention.
Figure 4:
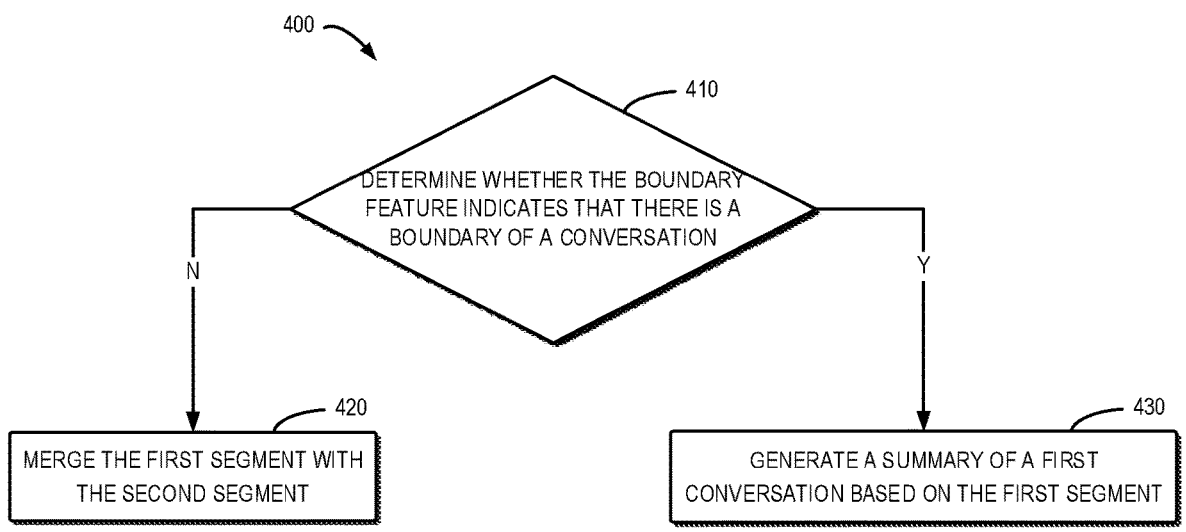
FIG. 4 depicts a flowchart of a method for processing segments, according to an embodiment of the present invention.

Reference is now made to FIG. 3, in which a flowchart of a method 300 of determining a boundary of a conversation according to an embodiment of the present invention is shown. The method 300 may be at least in part implemented by the computer system/server 12 as discussed with respect to FIG. 1, or other suitable devices.

At 310, the computer system/server 12 obtains a property of at least one of a segment (refers to as "first segment" hereinafter) and a further segment (refers to as "second segment" hereinafter) which occurs succeeding the first segment in a segment set. The property may include at least one of: a start time, an end time, a size, a time duration, a mandatory start, a mandatory end, a semantic start, and a semantic end of the first segment or the second segment. The computer system/server 12 may obtain the property of the first segment, or the property of the second segment, or both. For example, the computer system/server 12 may obtain the property of the segment 217, or the property of the segment 219, or both.

In some embodiments, the computer system/server 12 obtains properties including, but not limited to, a start time of the first segment, an end time of the first segment, a time duration of the first segment, a size of the first segment, a mandatory end of the first segment, a semantic end of the first segment, a start time of the second segment, an end time of the second segment, a time duration of the second segment, a size of the second segment, a mandatory start of the second segment, a semantic start of the second segment, and so on. With these properties, the computer system/server 12 may further determine whether there is a boundary of a conversation between the first segment and the second segment.

The segment set includes a plurality of segments belonging to at least one conversation. For example, the segment set may include the segments 217, 219, and 223. The method of obtaining the property has been described in detail in the above text, thus the description thereof is omitted.

At 320, the computer system/server 12 determines, based on the property, a boundary feature of at least one of the first segment and the second segment. The boundary feature indicates whether there is a boundary of a conversation between the first segment and the second segment.

The boundary feature of the first segment (refers to as "end boundary feature" hereinafter) may be obtained in a variety of ways. The end boundary feature indicates whether the first segment is an end of a conversation (refers to as "first conversation" hereinafter). In some embodiments, the computer system/server 12 may determine the end boundary feature based on a semantic end of the first segment. For example, the computer system/server 12 may determine the semantic end of the segment 217 based on the last message 212 of the segment 217, and then determine the end boundary feature of the segment 217 based on the semantic end. For example, the end boundary feature of the segment 217 may indicate whether the segment 217 is not the end of the conversation 210.

The computer system/server 12 can determine the semantic end by analyzing the end portion of the first segment with a boundary analyzer, and determine the end boundary feature based on the semantic end. As stated above, the boundary analyzer may be trained on phrases associated with the end of a conversation, and thus being capable of determining whether the end portion of the first segment is the end of a conversation. For example, since the boundary analyzer determines that the message 212 is not the end of a conversation after analyzing the message 212, the end boundary feature of the segment 217 may indicate the segment 217 is not the end of the conversation 210. In this way, the end of the conversation can be determined based on the semantics of the segment, thus improving the accuracy of the determination.

Alternatively, or in addition, the computer system/server 12 may determine the end boundary feature based on a mandatory end of the first segment. The mandatory end may be a mandatory end message that forces a conversation to end. For example, the computer system/server 12 may determine the mandatory end of the segment 217 based on the last message 212 of the segment 217, and then determine the end boundary feature of the segment 217 based on the mandatory end. For example, since the last message 212 of the segment 217 is not a mandatory end message, the end boundary feature of the segment 217 may indicate the segment 217 is not the end of the conversation 210. In this way, a conversation can be mandatorily ended, thus improving the control of the conversation.

Alternatively, or in addition, the computer system/server 12 may determine the start boundary feature based on a size of the first segment. The size may be the number of messages of the first segment. For example, the computer system/server 12 may determine the start boundary feature of the segment 219 by comparing the size to a predetermined threshold (for example, two thousand messages). For example, since the size is below the predetermined threshold, the end boundary feature of the segment 219 may indicate the segment 219 is not the start of a further conversation. In this way, the start of the conversation can be determined based on the size of the segments, such that the space granularity of the conversion can be controlled.

The boundary feature of the second segment (refers to as "start boundary feature" hereinafter) may be obtained in a variety of ways. The start boundary feature indicates whether the second segment is a start of a further conversation (refers to as "second conversation" hereinafter). In some embodiments, the computer system/server 12 may determine the start boundary feature of the second segment based on a semantic start of the second segment. For example, the computer system/server 12 may determine the semantic start of the segment 219 based on the first message 214 of the segment 219, and then determine the start boundary feature of the segment 219 based on the semantic start. For example, the start boundary feature of the segment 219 may indicate the segment 219 is not the end of the conversation 210.

The computer system/server 12 can determine the semantic start by analyzing the start portion of the second segment with a boundary analyzer, and determine the start boundary feature based on the semantic start. As stated above, the boundary analyzer may be trained on phrases associated with the start of a conversation, and thus being capable of determining whether a conversation semantically starts from the second segment. For example, since the boundary analyzer determines that the message 214 is not the start of a conversation after analyzing the message 214, the start boundary feature of the segment 219 may indicate the segment 219 is not the start of a further conversation. In this way, the start of the conversation can be determined based on the semantics of the segment, thus improving the accuracy of the determination.

Alternatively, or in addition, in some embodiments, the computer system/server 12 may determine the start boundary feature based on a mandatory start of the second segment. The mandatory start may be a mandatory start message that forces a conversation to start. For example, the computer system/server 12 may determine the mandatory start of the segment 219 based on the first message 214 of the segment 219, and then determine the start boundary feature of the segment 219 based on the mandatory start. In this example, since the first message 214 of the segment 219 is not a mandatory start message, the start boundary feature of the segment 219 may indicate the segment 219 is not the start of a further conversation. In this way, a conversation can be mandatorily started, thus improving the control of the conversation.

In further embodiments, the computer system/server 12 may alternatively, or additionally, determine the start boundary feature based on a total time duration of the first segment and the second segment. The total time duration may be a difference between the start time of the first segment and the end time of the second segment. For example, the computer system/server 12 may determine the total time duration of the segments 217 and 219 based on the first message 212 of the segment 217 and the last message 216 of the segment 219, and then determine the start boundary feature of the segment 219 by comparing the total time duration to a predetermined threshold (for example, twenty-four hours) (alternatively referred to as "first predetermined threshold" hereinafter). For example, since the total time duration is below the predetermined threshold, the start boundary feature of the segment 219 may indicate the segment 219 is not the start of a further conversation. In this way, the start of the conversation can be determined based on the duration of the segments, such that the time granularity of the conversation can be controlled.

In still further embodiments, alternatively or in addition, the computer system/server 12 may determine the start boundary feature based on a time gap of the first segment and the second segment. The time gap may be a difference between the start time of the first segment and the start time of the second segment. For example, the computer system/server 12 may determine the time gap of the segments 217 and 219 based on the first message 212 of the segment 217 and the first message 214 of the segment 219, and then determine the start boundary feature of the segment 219 by comparing the time gap to a predetermined threshold (for example, fourteen hours) (alternatively referred to as "second predetermined threshold" hereinafter). For example, since the time gap is below the predetermined threshold, the start boundary feature of the segment 219 may indicate the segment 219 is not the start of a further conversation. In this way, the start of the conversation can be determined based on the time gap of the segments, such that the time correlation among the segments of the conversation can be controlled.

Alternatively, or in addition, the computer system/server 12 may determine the start boundary feature based on a size of the first segment and the second segment. The size may be a total number of messages of the first segment and the second segment. For example, the computer system/server 12 may determine the size of the segments 217 and 219 based on the first message 212 of the segment 217 and the first message 214 of the segment 219, and then determine the start boundary feature of the segment 219 by comparing the size to a predetermined threshold (for example, two thousand messages). For example, since the size is below the predetermined threshold, the start boundary feature of the segment 219 may indicate the segment 219 is not the start of a further conversation. In this way, the start of the conversation can be determined based on the size of the segments, such that the space granularity of the conversation can be controlled.

Optionally, in some embodiments, the persistent chat 200 is a real time chat in which new messages are added into the chat 200 over time. For the newly added messages that belong to the last segment, for example the segment 223, the computer system/server 12 automatically checks the boundary of the conversation associated with the last segment. The computer system/server 12 may determine that the boundary feature indicates that there is a boundary of a conversation, if the last segment has a mandatory end or a semantic end, or if the duration, the gap, or the size of the last segment reaches a predetermined threshold. For example, the duration may be the difference between the current time and the start time of the last segment, and the gap may be the difference between the current time and the start time of the last segment. Alternatively, in the real time chat, the last message 224 may be analyzed by a boundary analyzer. If the last message is determined to be a semantic end, the boundary feature may be determined to indicate that there is a boundary of a conversation after the segment 223.

In some embodiments, if the end boundary feature indicates that the first segment includes an end of a first conversation, the computer system/server 12 determines that there is an end boundary of the first conversation. For example, when the end boundary feature of the segment 219 indicates that the segment 219 is the end of the conversation 210, the computer system/server 12 determines that there is an end boundary of the conversation 210.

Additionally, or alternatively, if the start boundary feature indicates that the second segment includes a start of a second conversation, the computer system/server 12 determines that there is a start boundary of the second conversation. For example, when the start boundary feature of the segment 223 indicates that the segment 223 is the start of the conversation 220, the computer system/server 12 determines that there is a start boundary of the conversation 220.

Additionally, or alternatively, if the end boundary feature indicates that the first segment is not an end of a first conversation, and if the start boundary feature indicates that the second segment is not a start of a second conversation, the computer system/server 12 determines that there is no boundary of a conversation. For example, when the end boundary feature of the segment 217 indicates that the segment 217 is not the end of the conversation 210 and the start boundary feature of the segment 219 indicates that the segment 219 is not the start of a further conversation, the computer system/server 12 determines that there is no boundary of the conversation 210.

With the boundary feature, the boundary of a conversation can be determined more conveniently and efficiently. As a result, the conversation can be summarized in a more accurate and correct way.

In addition, in some embodiments, the boundary feature may be employed to process the segments. FIG. 4 shows a flowchart of a method 400 of processing segments according to an embodiment of the present invention.

At 410, the computer system/server 12 determines whether the boundary feature indicates that there is a boundary of a conversation between the first segment and the second segment. The boundary feature may be determined according to embodiments described with respect to method 300 and thus its determination is omitted here.

If the boundary feature indicates that there is no conversation boundary between the first segment and the second segment, the computer system/server 12 merges the first segment with the second segment at 420.

Still referring to the example described with respect to FIG. 2, since the end boundary feature of the segment 217 indicates that the segment 217 is not the end of the conversation 210, and the start boundary feature of the segment 219 indicates that the segment 219 is not the start of a further conversation, the computer system/server 12 may determine that the segments 217 and 219 belong to the same conversation 210, and update the segment 217 by merging the segments 217 and 219. In this way, the segments which are determined to belong to the same conversation can be combined.

There may be a variety of ways of combining the segments. In some embodiments, the end time, the mandatory end, and/or the semantic end of the first segment may be updated with those of the second segment. Additionally, or alternatively, the size of the first segment is updated with the sum of sizes of the first segment and the second segment.

For example, the end time of the segment 217 is set as the end time of the segment 219. The size of the segment 217 is set as the sum of the sizes of the segment 217 and the segment 219. In addition, the mandatory end and the semantic end of the segment 217 are set as the mandatory end and the semantic end of the segment 219, respectively. Optionally, the original second segment 219 can be removed to save storage.

If the boundary feature indicates that there is a conversation boundary between the first segment and the second segment, the computer system/server 12 may generate a summary of the conversation at 430. In some embodiments, the summary of the conversation may be generated in several ways, for example, by analyzing the conversation using a text analyzer. In further embodiments, if segments belonging to the conversation have been merged into one segment, for example, the first segment, the computer system/server 12 may generate the summary based on the merged segment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining a boundary of a conversation in electronic text, comprising:
   obtaining a property of at least one of a first segment of electronic text and a second segment of electronic text in a segment set, the segment set including a plurality of segments that belong to at least one conversation in electronic text, the second segment occurring after the first segment;
   determining, based on the property, a boundary feature of at least one of the first segment and the second segment, the boundary feature indicating that there is a boundary of a conversation after the first segment, wherein the determined boundary feature comprises determining a start boundary feature based on a first end time of the first segment and a second start time of the second segment, wherein determining the start boundary feature comprises:
      computing a time span between a first start time of the first segment and a second end time of the second segment;
      determining whether the time span exceeds a first predetermined threshold; and
      in response to determining that the time span exceeds the first predetermined threshold, determining that the start boundary feature indicates that the second segment includes a start of a second conversation;

computing a time gap between a first end time of the first segment and a second start time of the second segment;

determining that the time gap exceeds a second predetermined threshold;

in response to determining that the time gap exceeds the second predetermined threshold, determining that the start boundary feature indicates that the second segment includes a start of a second conversation;

merging one or more successive segments based on the boundary feature of a single segment;

generating a concise segment summary based on the boundary features of the merged one or more successive segments; and displaying the generated concise segment summary, of the one or more successive segments, based on the boundary features of the conversation in electronic text.

2. The method of claim 1, wherein obtaining the property further comprises obtaining at least one of:

the first start time of the first segment, the first end time of the first segment, a first time duration of the first segment, a first size of the first segment, a first mandatory end of the first segment, the second start time of the second segment, the second end time of the second segment, a second time duration of the second segment, a second size of the second segment, a second mandatory start of the second segment, and a second semantic start of the second segment.

3. The method of claim 2, wherein obtaining the second semantic start of the second segment comprises:

determining the second semantic start of the second segment by analyzing the second segment with a boundary analyzer, wherein the boundary analyzer is trained on phrases associated with a start of a conversation.

4. The method of claim 1, wherein determining the boundary feature comprises at least one of:

determining an end boundary feature of the first segment based on a semantic end of the first segment;

determining the end boundary feature based on a mandatory end of the first segment; and determining the end boundary feature based on a size of the first segment, wherein the end boundary feature indicates that the first segment includes an end of a first conversation.

5. The method of claim 1, wherein determining the boundary feature comprises at least one of:

determining the start boundary feature based on a semantic start of the second segment;

determining the start boundary feature based on a mandatory start of the second segment; and determining the start boundary feature based on a first size of the first segment and a second size of the second segment, wherein the start boundary feature indicates that the second segment includes a start of a second conversation.

6. The method of claim 1, further comprising:

in response to the boundary feature indicating that there is a boundary of a conversation between the first segment and the second segment, generating a summary of a first conversation based on the first segment.

7. The method of claim 1, further comprising:

in response to the boundary feature indicating that there is no boundary of a conversation between the first segment and the second segment, merging the first segment with the second segment.

8. A device for determining a boundary of a conversation, comprising:

a processing unit; and a memory coupled to the processing unit and storing instructions thereon, the instructions, when executed by the processing unit, performing acts including:

obtaining a property of at least one of a first segment of electronic text and a second segment of electronic text in a segment set, the segment set including a plurality of segments that belong to at least one conversation in electronic text, the second segment occurring after the first segment;

determining, based on the property, a boundary feature of at least one of the first segment and the second segment, the boundary feature indicating that there is a boundary of a conversation after the first segment, wherein the determined boundary feature comprises determining a start boundary feature based on a first end time of the first segment and a second start time of the second segment, wherein determining the start boundary feature comprises:

computing a time span between a first start time of the first segment and a second end time of the second segment;

determining whether the time span exceeds a first predetermined threshold; and in response to determining that the time span exceeds the first predetermined threshold, determining that the start boundary feature indicates that the second segment includes a start of a second conversation;

computing a time gap between a first end time of the first segment and a second start time of the second segment;

determining that the time gap exceeds a second predetermined threshold;

in response to determining that the time gap exceeds the second predetermined threshold, determining that the start boundary feature indicates that the second segment includes a start of a second conversation;

merging one or more successive segments based on the boundary feature of a single segment;

generating a concise segment summary based on the boundary features of the merged one or more successive segments; and displaying the generated concise segment summary, of the one or more successive segments, based on the boundary features of the conversation in electronic text.

9. The device of claim 8, wherein obtaining the property further comprises obtaining at least one of:

the first start time of the first segment, the first end time of the first segment, a first time duration of the first segment, a first size of the first segment, a first mandatory end of the first segment, the second start time of the second segment, the second end time of the second segment, a second time duration of the second segment, a second size of the second segment, a second mandatory start of the second segment, and a second semantic start of the second segment.

10. The device of claim 9, wherein obtaining the second semantic start of the second segment comprises:

determining the second semantic start of the second segment by analyzing the second segment with a boundary analyzer, wherein the boundary analyzer is trained on phrases associated with a start of a conversation.

11. The device of claim 8, wherein determining the boundary feature comprises at least one of:

determining an end boundary feature of the first segment based on a semantic end of the first segment;

determining the end boundary feature based on a mandatory end of the first segment; and determining the end boundary feature based on a size of the first segment, wherein the end boundary feature indicates that the first segment includes an end of a first conversation.

12. The device of claim 8, wherein determining the boundary feature comprises at least one of:

determining the start boundary feature based on a semantic start of the second segment;

determining the start boundary feature based on a mandatory start of the second segment; and determining the start boundary feature based on a first size of the first segment and a second size of the second segment, wherein the start boundary feature indicates that the second segment includes a start of a second conversation.

13. The device of claim 8, wherein the acts further include:

in response to the information indicating that there is a boundary of a conversation associated with at least one of the first segment and the second segment, generating a summary of a first conversation based on the first segment.

14. The device of claim 8, wherein the acts further include:

in response to the information indicating that there is no boundary of a conversation associated with at least one of the first segment and the second segment, merging the first segment with the second segment.

15. A computer program product being tangibly stored on a non-transient machine-readable medium and comprising machine-executable instructions, the machine-executable instructions, when executed on a device, causing the device to:

obtain a property of at least one of a first segment of electronic text and a second segment of electronic text in a segment set, the segment set including a plurality of segments that belong to at least one conversation in electronic text, the second segment occurring after the first segment;

determine, based on the property, a boundary feature of at least one of the first segment and the second segment, the boundary feature indicating that there is a boundary of a conversation after the first segment, wherein the determined boundary feature comprises determining a start boundary feature based on a first end time of the first segment and a second start time of the second segment, wherein determining the start boundary feature comprises:

computing a time span between a first start time of the first segment and a second end time of the second segment;

determining whether the time span exceeds a first predetermined threshold; and in response to determining that the time span exceeds the first predetermined threshold, determining that the start boundary feature indicates that the second segment includes a start of a second conversation;

compute a time gap between a first end time of the first segment and a second start time of the second segment;

determine that the time gap exceeds a second predetermined threshold;

in response to determining that the time gap exceeds the second predetermined threshold, determining that the start boundary feature indicates that the second segment includes the start of the second conversation;

merge one or more successive segments based on the boundary feature of a single segment;

generate a concise segment summary based on the boundary features of the merged one or more successive segments; and display the generated concise segment summary, of the one or more successive segments, based on the boundary features of the conversation in electronic text.

* * * * *